April 5, 1932. G. W. WILDIN 1,851,997
SHOCK ABSORBING MECHANISM
Filed June 19, 1929 2 Sheets-Sheet 1
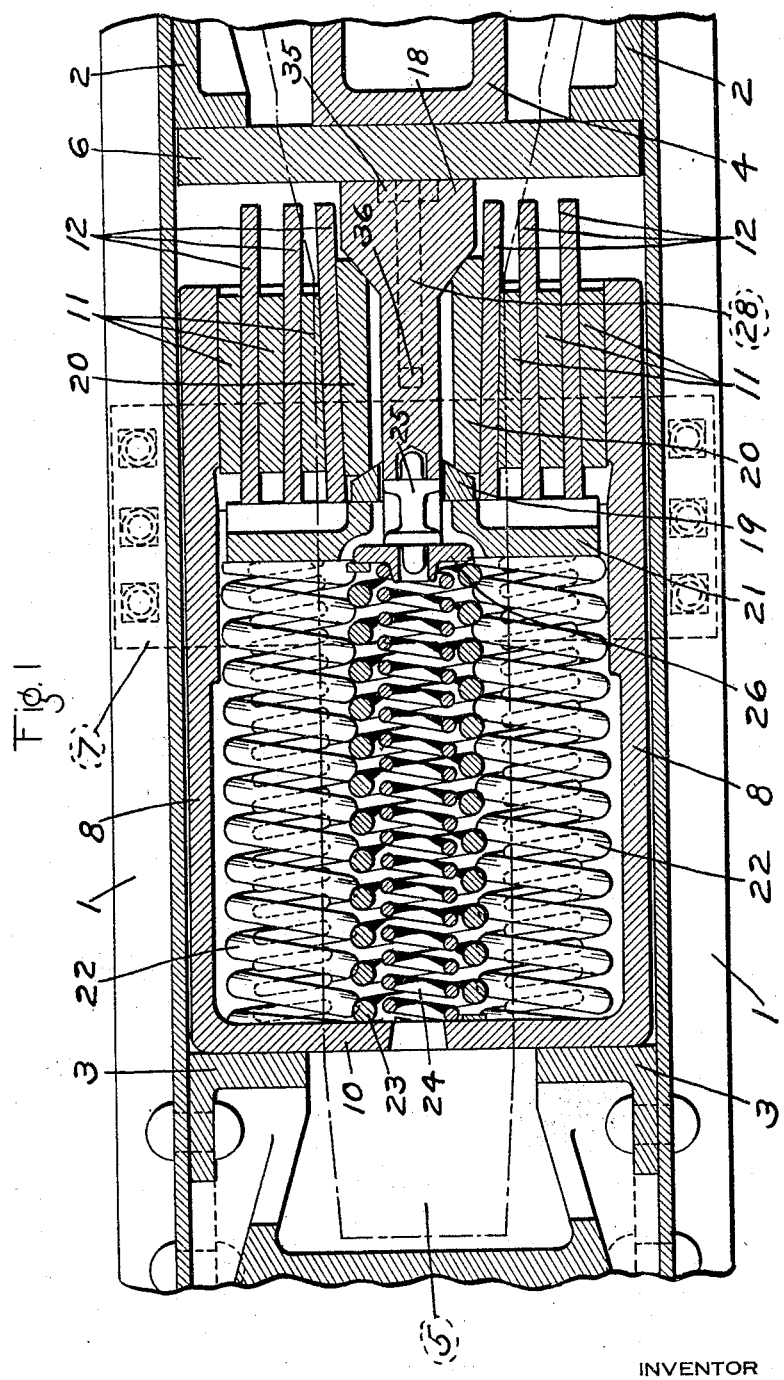
INVENTOR
GEORGE W. WILDIN
BY
ATTORNEY April 5, 1932.　　　　G. W. WILDIN　　　　1,851,997
SHOCK ABSORBING MECHANISM
Filed June 19, 1929　　　2 Sheets-Sheet 2
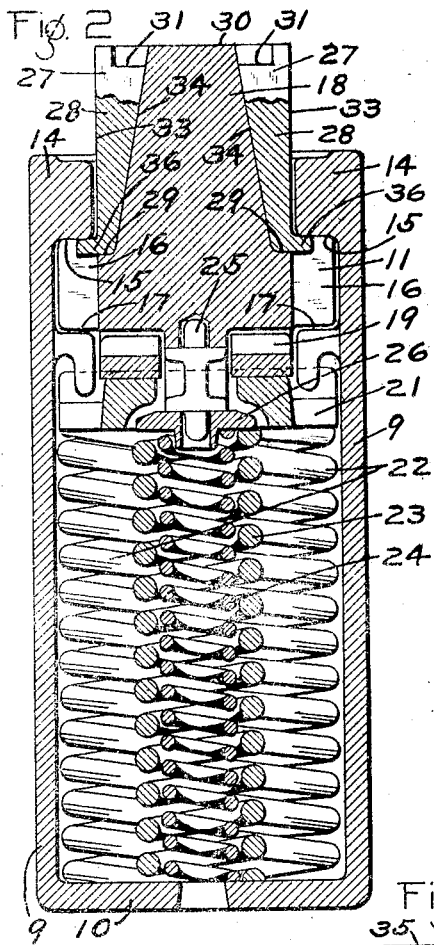
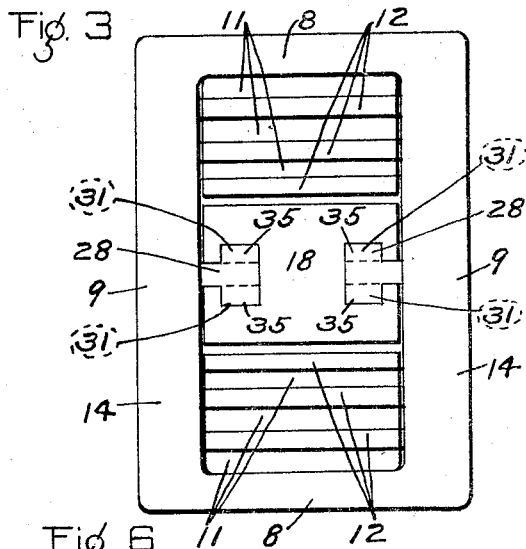
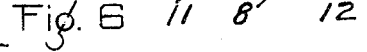
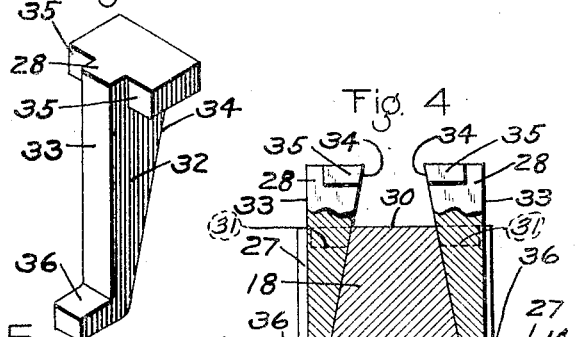
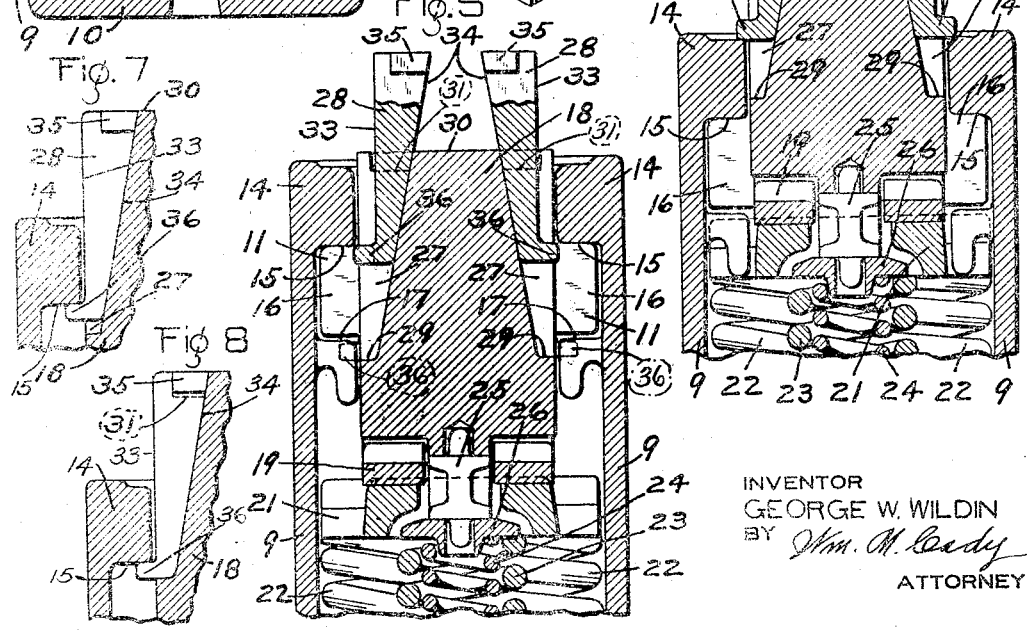
INVENTOR
GEORGE W. WILDIN
BY
ATTORNEY Patented Apr. 5, 1932

1,851,997

UNITED STATES PATENT OFFICE

GEORGE W. WILDIN, OF PITTSBURGH, PENNSYLVANIA, ASSIGNOR, BY MESNE ASSIGNMENTS, TO CARDWELL WESTINGHOUSE COMPANY, OF CHICAGO, ILLINOIS, A CORPORATION OF DELAWARE

SHOCK ABSORBING MECHANISM

Application filed June 19, 1929. Serial No. 372,108.

This invention relates to improvements in shock absorbing mechanisms of the type especially adapted for use in draft riggings for railway rolling stock and particularly to that type comprising a casing containing a spring resisted plunger or friction wedge means through which buffing and pulling shocks are transmitted.

The principal object of my invention is to provide a shock absorbing mechanism, of the above type, with novel, efficient and inexpensive means for maintaining the plunger assembled with the other parts of the mechanism.

Another object of my invention is to provide a shock absorbing mechanism, of the above type, with locking means adapted to be moved into and out of a position to lock with the casing and plunger when the plunger is moved inwardly a predetermined distance relative to the casing in assembling or disassembling the mechanism.

A further object of my invention resides in the method of locking the shock transmitting plunger of a shock absorbing mechanism, of the above type, in assembled relation to the other parts of the mechanism which consists in first forcing the plunger inwardly a predetermined distance against the pressure of the shock absorbing springs, then inserting a locking member in a direction longitudinally of the mechanism between the plunger and casing, said member being forced outwardly in a direction toward the casing as it is so inserted and then relieving the compressing force on the plunger to permit the pressure of the shock absorbing springs to move said plunger into locking engagement with the locking member and the locking member into locking engagement with the casing.

Other objects and advantages will appear in the following more detailed description of my invention.

In the accompanying drawings Figure 1 is a horizontal longitudinal sectional view of a railway draft rigging embodying my invention; Fig. 2 is vertical longitudinal sectional view of the friction shock absorbing mechanism in its assembled condition; Fig. 3 is an elevational view of the forward end of the friction shock absorbing mechanism; Fig. 4 is a sectional view like Fig. 2 of a portion of the mechansm preparatory to inserting the locking members; Fig. 5 is a sectional view like Fig. 4 and showing the several parts of the shock absorbing mechanism in positions to permit of the insertion or removal of the locking members; Fig. 6 is an isometric view of one of the locking members and Figs. 7 and 8 are fragmentary sectional views, made on a reduced scale, showing modifications of my invention.

In the drawings, the reference characters 1, 1 indicate the usual spaced center or draft sills of a railway car, to which are secured the usual front draft lugs 2, 2 and rear draft lugs 3, 3.

The reference character 4 indicates the inner end of the drawbar to which is operatively connected the usual yoke 5.

Disposed within the yoke 5 is my improved friction shock absorbing mechanism and a front follower plate 6, all of which are supported in the usual manner by a strap or plate 7 detachably secured to the sills, 1, 1, so that the follower plate engages the front draft lugs 2, 2 and the rear end portion of the shock absorbing mechanism engages the rear draft lugs 3, 3.

My improved friction shock absorbing mechanism may comprise a hollow rectangular casing having side walls 8, top and bottom walls 9 and a rear end wall 10. The forward end of the casing is open and contains groups of alternated friction plates 11 and 12 which are disposed at opposite sides of a wedging mechanism, the plates 11 being anchored to the casing, and the plates 12 being movable relative to the plates 11 under buffing and pulling impacts.

The forward end portions of the top and bottom walls 9 of the casing have thickened portions 14, 14 which form shoulders 15, 15 interiorly of the casing, with which shoulders, lugs 16, 16 projecting from the top and bottom edges of the plates 11, engage, thus anchoring these plates against outward movement relative to the casing, inward movement of the plates being stopped by their engagement with shoulders 17, 17 on the walls 9.

The wedging mechanism comprises longitudinally disposed wedge blocks 18 and 19 having opposed wedging faces adapted to engage corresponding wedging faces of wedge blocks or shoes 20 disposed at opposite sides of the wedge blocks 18 and 19.

Disposed within the casing is a follower or spring plate 21 which, at one side, engages the inner ends of the movable friction plates 12 and also the wedge block 19, the other side of the plate 21 being engaged by four springs 22.

The wedge block 18 is acted upon by springs 23 and 24 through the medium of a follower 25, which extends through an opening in the spring plate 21, and a spring plate 26 which is interposed between the tops of the springs 23 and 24 and the inner end of the follower 25.

Formed in the top and bottom sides of the wedge block 18, are grooves 27, 27 for the reception of locking members 28, 28. Each of these grooves, extends longitudinally of the wedge block, from the forward end thereof to any suitable point rearwardly of the forward end, and throughout its length varies in depth, from its deepest portion at its outer end, to its shallowest portion at its inner end. The inner end of each slot is defined by a shoulder 29. In the outer end face 30 of the wedge block, each of the grooves 27 is widened to form shoulders 31, 31, the upper ends of the locking members 28 being broken away in Fig. 2 to clearly show these shoulders.

Each locking member 28 comprises a portion 32 which is of a width slightly less than the width of the groove 27 and has an outer straight surface 33 and an inner sloping surface 34 which corresponds to the slope of the bottom of the grooves 27. At its outer end the locking member is provided with ears or lugs 35 which project outwardly from opposite sides of the member, and at its inner end is provided with a lug 36 which projects outwardly beyond the plane of the surface 33.

When the shock absorbing mechanism is assembled as shown in Figs. 1, 2 and 3 the locking members 28, 28 substantially fill the grooves 27, 27, the lugs 36, 36 engage the shoulders 15, 15 of the block 18, and the lugs 35 are seated on the shoulders 31 of the casing within the widened portions of the grooves so that the wedge block 18 will be held against undue outward movement by the engagement of the shoulders 29 of the wedge block with the undersides of the lugs 36. Since the lugs 35 of the members 28 are seated in the grooves 27 the outer ends of these members are prevented from moving outwardly relative to the wedge block in directions across the casing thus eliminating the possibility of the binding of the members against the casing and also preventing undue vibrations of the members when the mechanism is in service.

In assembling the friction shock absorbing mechanism the casing is preferably placed in a vertical position as shown in Figs. 2 to 5 inclusive and the springs 22, 23, and 24, spring plates 26 and 21, stationary plates 11, movable plates 12 and follower 25 are mounted in the casing through the open forward end thereof in the order named. The wedge block 18 is now inserted through the forward end of the casing and seats on the outer end of the follower 25. Since all of the springs in the casing are expanded to their free length the parts of the mechanism will be in the positions shown in Fig. 4. From this view it will be noted that the wedge block 18 will be in such a forward position relative to the casing that the locking members cannot be moved to their locking positions.

After the several parts of the mechanism have been positioned as just described, pressure is applied, through the medium of any desired pressure exerting means, to the outer end of the wedge block 18, causing said block to move inwardly relative to the casing and against the pressure of the springs 22, 23 and 24. After the wedge block has thus been moved inwardly a short distance the distance between the inner surface of each of the thickened portions 14 of the casing and the bottom of the groove 27 will be sufficient to permit of the insertion of the inner end of the locking member. With both of the locking members thus positioned and the wedge block being pressed rearwardly the locking members will continue to move inwardly due to the force of gravity and when the wedge has been moved to the position shown in Fig. 5, the locking members will drop into positions as shown in dot and dash lines in this figure, in which positions the inner ends of locking members engage the shoulders 29 of the wedge block and the lugs 35 engage the shoulders 31 of the wedge block. Pressure on the wedge block is now relieved and the pressure of the springs in the casing move the wedge block forward, and when the lugs 36 on the locking members come into engagement with the shoulders 15 of the casing, the wedge block will be positively stopped against further outward movement as shown in Fig. 2.

Instead of permitting the locking members to drop into place by the force of gravity as just described, the wedge block may be forced rearwardly to the position shown in Fig. 5 and the locking members then inserted.

When it is desired to remove the wedge block 18 from the mechanism, said block 18 is forced rearwardly to the position shown in Fig. 5 when, it will be seen, the locking members may be easily removed.

When the shock absorbing mechanism is assembled as described and the mechanism is embodied in a railway draft rigging as shown in Fig. 1, the outer ends of the locking members 28, which are flush with the surface 30, are engaged by the follower plate and due to this, outward movement of the locking members relative to the wedge block when the relative positions of the wedge block 18 and casing are changed due to service shocks is prevented.

In Fig. 7 a modification of the invention is illustrated in which the lugs 35 on the locking members only are engaged by the wedge block in locking the block in operative position.

In Fig. 8 a further modification has been illustrated in which the lugs 35 of the locking members are out of engagement with the shoulders 31 and the inner end portions of the members are engaged by the wedge block in locking the block in operative position.

It will be noted from the foregoing description that I have provided simple and efficient means for locking the wedge block, of a friction shock absorbing mechanism, in its operative position, which means may be readily inserted from the front end of the casing of the mechanism while the wedge block is in the casing.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a friction shock absorbing mechanism, the combination with a casing, of lugs within the forward end of said casing, spring resisted friction means mounted in and engaging the forward end of the casing, said friction means including a pressure exerting wedge block having grooves formed in two opposite sides thereof, the bottoms of said grooves diverging rearwardly from the forward end of the wedge block, members cooperating with said lugs and wedge block for maintaining said wedge block assembled with the casing, said members being insertable in said grooves and between the wedge block and casing from the forward end of the casing and wedge block when said wedge block is moved inwardly a predetermined distance relative to the casing, said diverging bottoms of the grooves forcing said members apart into positions to cooperate with said lugs as said members are being inserted.

2. In a draft gear, in combination, a casing having an open end and instanding ribs across two of its side walls adjacent such end, shock-absorbing means within the casing including a follower-engaging thrust member having longitudinally channeled side walls fitting between the ribs, such channels extending from the outer end of the member and terminating short of its inner end and being of greater depth at their outer than at their inner ends, and locking bars housed within the channels and having rib-engaging lugs at their inner ends.

3. In a draft gear, in combination, a casing having an open end and instanding ribs across two of its side walls adjacent such end, shock-absorbing means within the casing including a follower-engaging thrust member having longitudinally channeled side walls fitting between the ribs, such channels extending from the outer end of the member and terminating short of its inner end and being of greater depth at their outer than at their inner ends, locking bars housed within the channels and having rib-engaging lugs at their inner ends, and inwardly facing shoulders at their outer ends engageable with complementary shoulders on the thrust member.

4. In a draft gear, in combination, a casing having an open end and instanding ribs across two of its side walls adjacent such end, shock-absorbing means within the casing including a follower-engaging thrust member having longitudinally channeled side walls fitting between the ribs, such channels extending from the outer end of the member and terminating short of its inner end and being of greater depth at their outer than at their inner ends, locking bars housed within the channels and having rib-engaging lugs at their inner ends, and means for preventing lateral movement of the bars within the channels.

5. In a shock absorbing mechanism, in combination, a casing having an open end and inwardly facing shoulders adjacent thereto, a thrust element projecting into the casing and having rearwardly facing lateral shoulders adjacent to its inward end, and lateral faces diverging from its outer end and leading to its shoulders, shock-absorbing elements housed within the casing and cooperating with the thrust member, and retaining bars having bearing on the diverging faces and engageable with the shoulders of the thrust element and casing.

6. In a shock absorbing mechanism, in combination, a casing having an open end and inwardly facing shoulders adjacent thereto, a thrust element projecting into the casing and having rearwardly facing lateral shoulders adjacent to its inward end and lateral faces diverging from its outer end and leading to its shoulders, shock absorbing elements housed within the casing and cooperating with the thrust member, retaining bars having bearing on the diverging faces and engageable with the shoulders of the thrust element and casing, and means for holding the bars in contact with the thrust element.

7. In a shock absorbing mechanism, in combination, a casing having an open end and rearwardly facing shoulders adjacent thereto, a thrust element projecting into the casing and having longitudinal channels of gradually decreasing depth inwardly and shoulders facing the inner end of the channels, retaining bars seated within the channels and having lateral shoulders engageable with the casing shoulders, and shock absorbing elements within the casing and cooperating with the thrust element.

8. In a shock absorbing mechanism, in combination, a casing having an open end and rearwardly facing shoulders adjacent thereto, a thrust element projecting into the casing and having longitudinal channels of gradually decreasing depth inwardly and shoulders facing the inner end of the channels, retaining bars seated within the channels and having lateral shoulders engageable with the casing shoulders, means for holding the bars within the channels, and shock absorbing elements within the casing and cooperating with the thrust element.

In testimony whereof I have hereunto set my hand, this 8th day of June, 1929.

GEORGE W. WILDIN.